United States Patent
Graaff et al.

(10) Patent No.: US 7,011,358 B2
(45) Date of Patent: Mar. 14, 2006

(54) THIN SECTION SIDEWALL ASSEMBLIES FOR VANS AND TRAILERS

(75) Inventors: Wolfgang Graaff, Chicago, IL (US); Thomas Huddle, Charleston, IL (US)

(73) Assignee: Great Dane Limited Partnership, Chicago, IL (US)

( * ) Notice: Subject to any disclaimer, the term of this patent is extended or adjusted under 35 U.S.C. 154(b) by 0 days.

(21) Appl. No.: 10/772,147

(22) Filed: Feb. 4, 2004

(65) Prior Publication Data

US 2004/0217625 A1 Nov. 4, 2004

Related U.S. Application Data

(60) Continuation of application No. 10/252,354, filed on Sep. 23, 2002, now abandoned, which is a division of application No. 09/724,137, filed on Nov. 28, 2000.

(60) Provisional application No. 60/195,036, filed on Apr. 6, 2000.

(51) Int. Cl.
*B62D 25/02* (2006.01)

(52) U.S. Cl. .................................................. 296/186.1
(58) Field of Classification Search ................ 296/191, 296/186.1, 182.1, 186.5, 186.4, 39.1; 52/588.1, 52/582.1, 584.1
See application file for complete search history.

(56) References Cited

U.S. PATENT DOCUMENTS

| 3,393,920 | A | * | 7/1968 | Ehrlich | 296/181 |
| 4,015,876 | A | * | 4/1977 | Hulverson et al. | 296/181 |
| 4,357,047 | A | * | 11/1982 | Katz | 296/181 |
| 4,420,183 | A | * | 12/1983 | Sherman | 296/181 |
| 4,904,017 | A | * | 2/1990 | Ehrlich | 296/181 |
| 4,940,279 | A | * | 7/1990 | Abott et al. | 296/181 |
| 5,509,714 | A | * | 4/1996 | Schmidt | 296/181 |
| 5,664,826 | A | * | 9/1997 | Wilkens | 296/181 |
| 5,860,693 | A | * | 1/1999 | Ehrlich | 296/191 |
| 5,876,089 | A | * | 3/1999 | Ehrlich | 296/181 |
| 5,938,274 | A | * | 8/1999 | Ehrlich | 296/191 |
| 5,992,117 | A | * | 11/1999 | Schmidt | 52/582.1 |
| 5,997,076 | A | * | 12/1999 | Ehrlich | 296/181 |

OTHER PUBLICATIONS

Drawing entitled Post/Liner Layout Strick, Trailmobile dated Jun. 29, 2000.

* cited by examiner

*Primary Examiner*—Joseph D. Pape

(57) ABSTRACT

Several embodiments of sidewall assemblies having side posts and plastic liners affixed to an outer side sheet of a van or trailer. The liners have edges extending in contacting relationship with the edge portions of the side posts in connected relationship. Protuberances and foam material extend between the plastic liners and the side sheet for added strength. Slots may be provided in the posts for securement purposes.

22 Claims, 6 Drawing Sheets

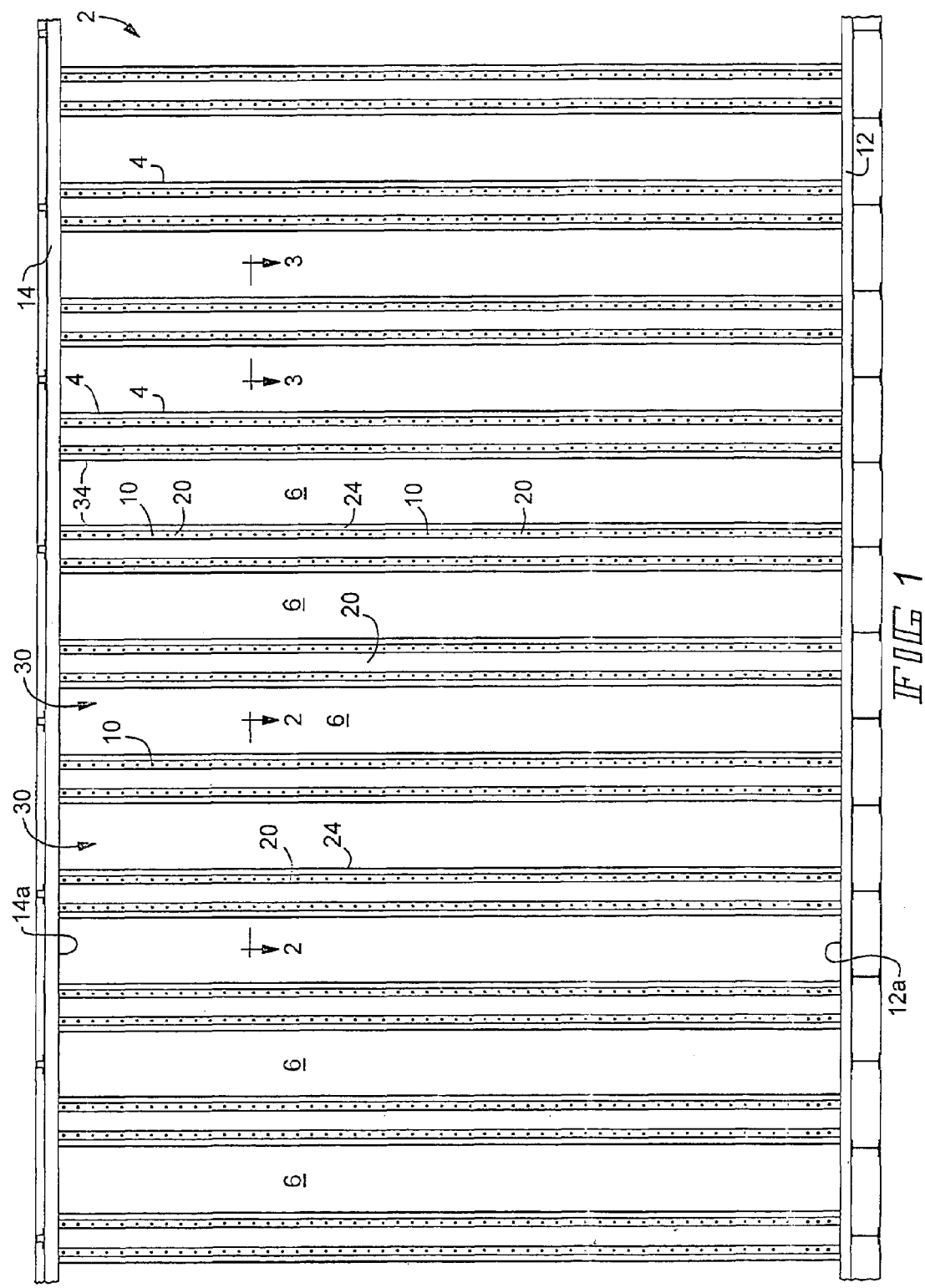

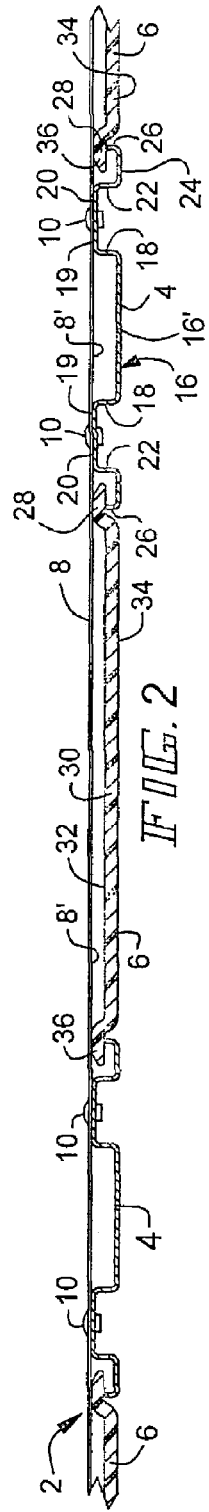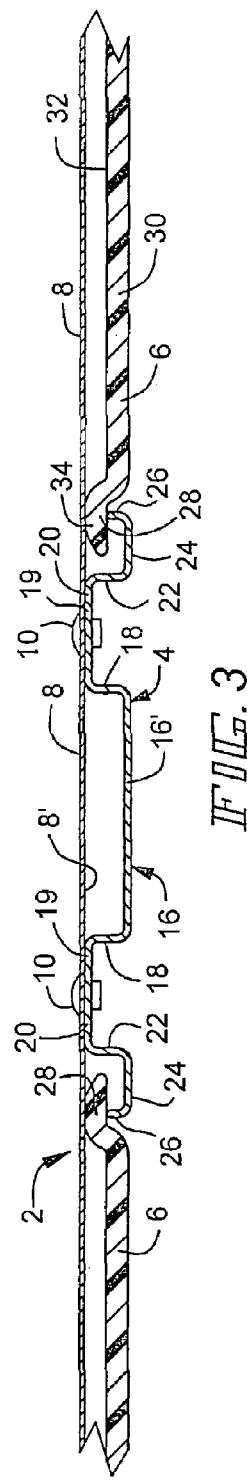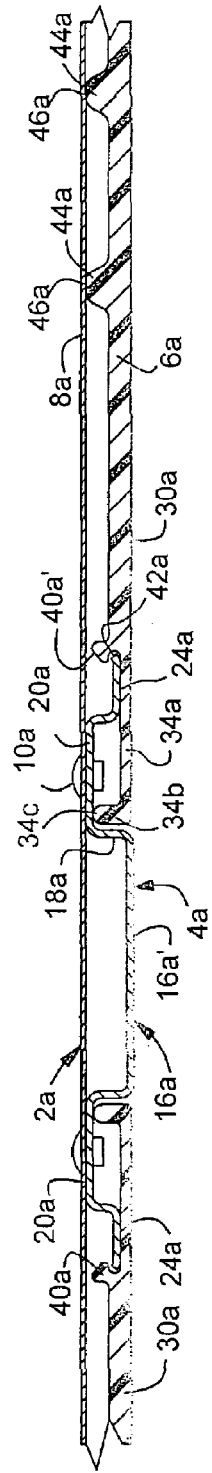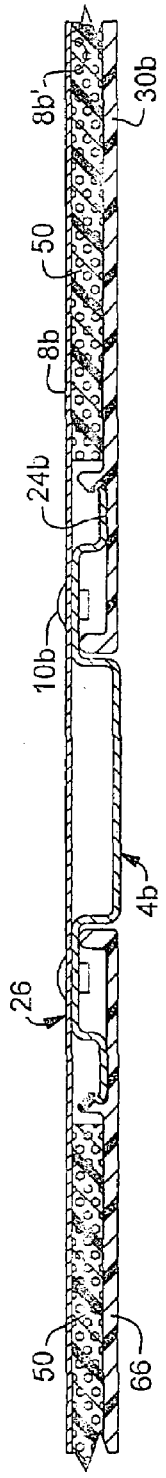

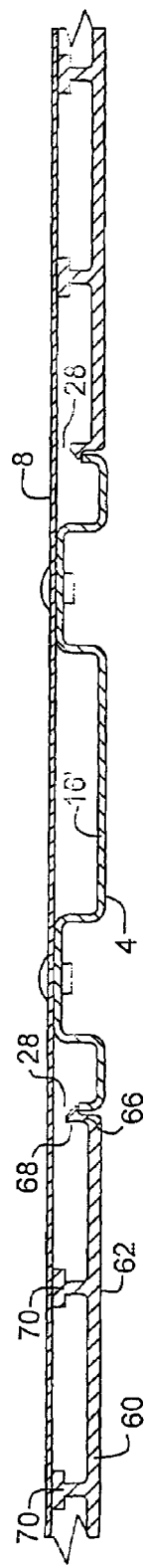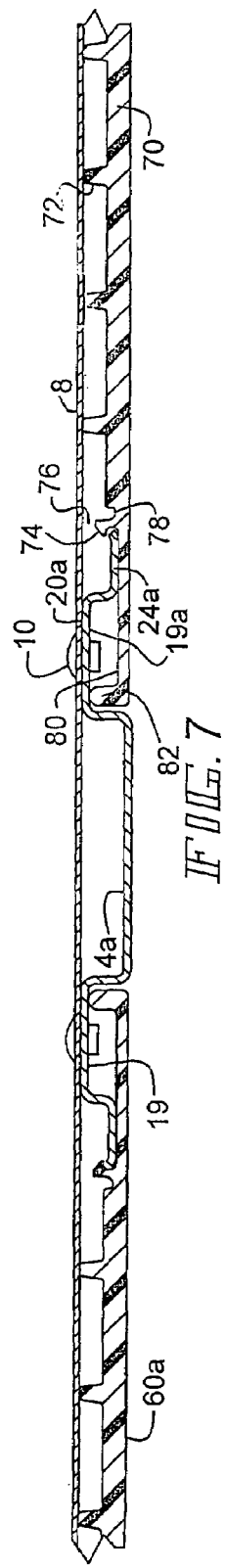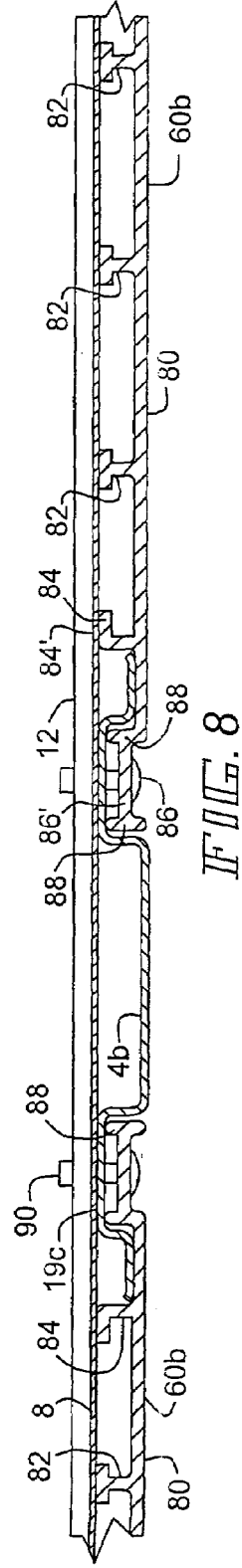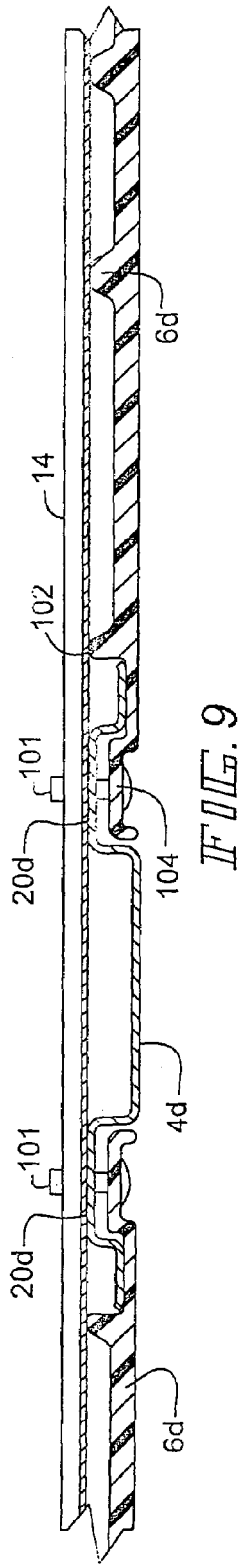

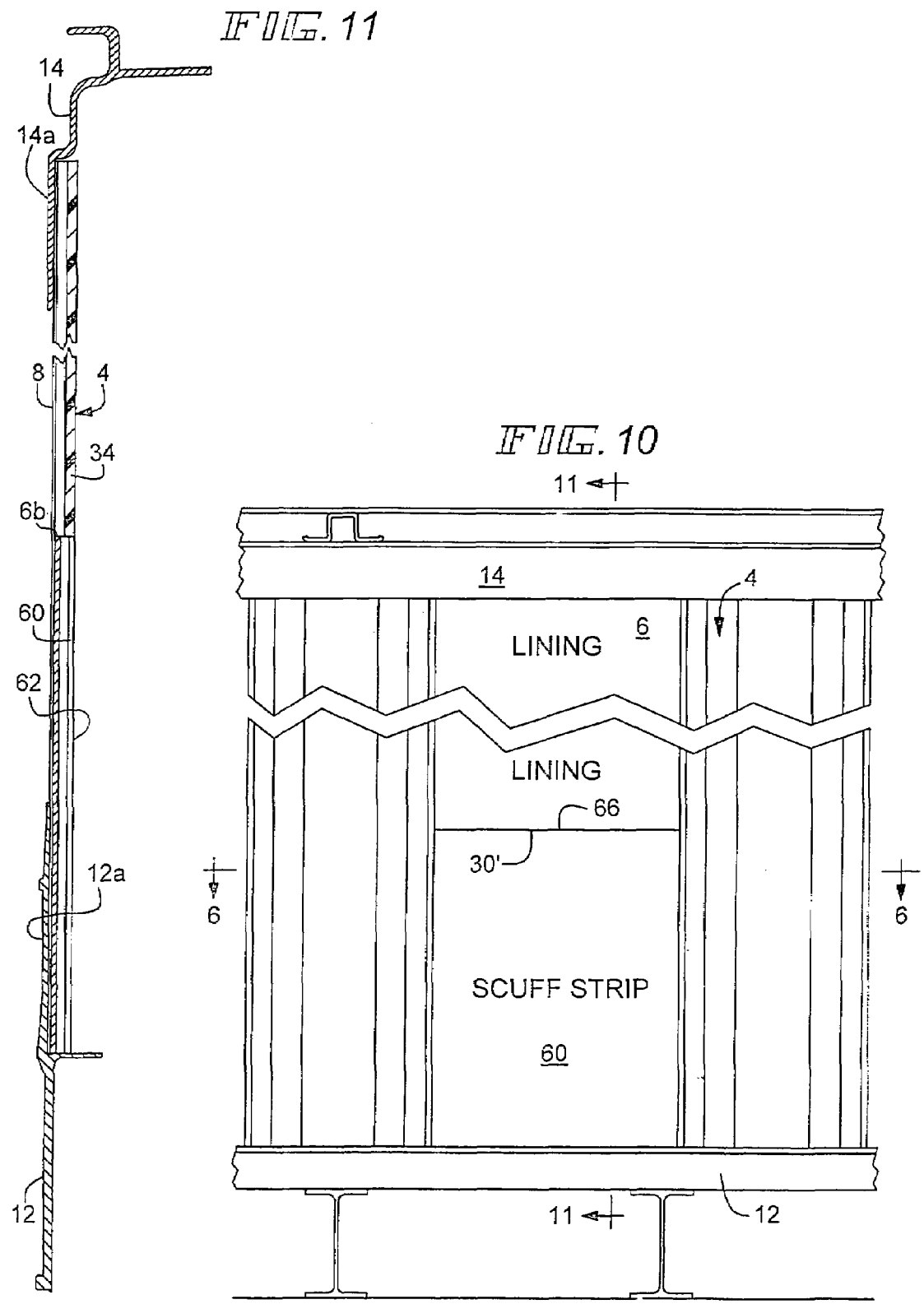

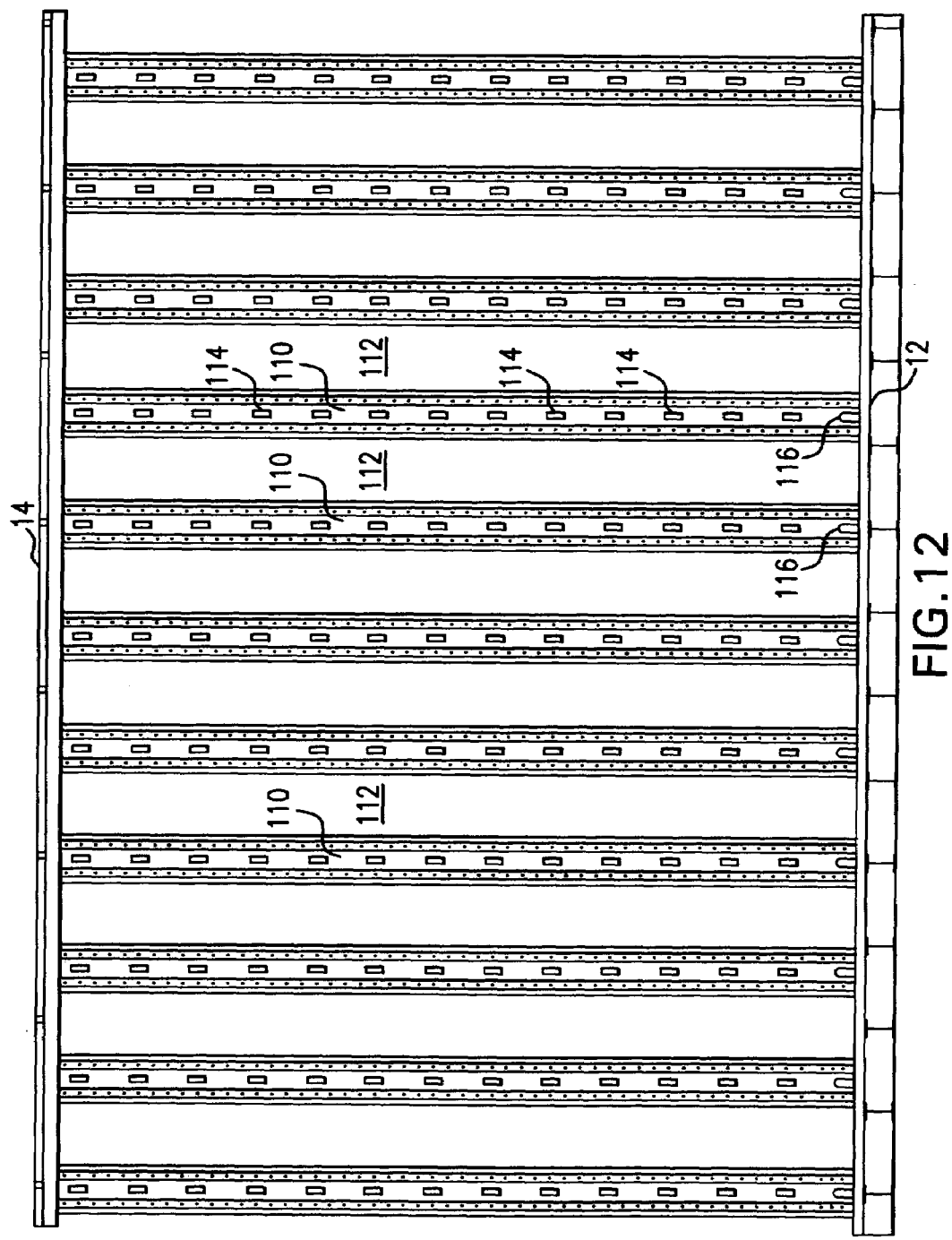

THIN SECTION SIDEWALL ASSEMBLIES FOR VANS AND TRAILERS

This application claims benefit of the filing date of the provisional application Ser. No. 60/195,036 filed Apr. 6, 2000 and is a continuation of non-provisional application, Ser. No. 10/252,354 filed Sep. 23, 2002 now abandoned that is a divisional application of Ser. No. 09/724,137 filed Nov. 28, 2000.

BACKGROUND OF THE INVENTION

1. Field of the Invention

This invention relates in general to cargo carrying vehicles and more particularly, to several embodiments of sidewall assemblies, with or without scuff strips, having refined widths in a vehicular van or trailer.

2. Summary of the Prior Art

In the past the sidewall structure of cargo carrying vans and trailers is constructed having a typical design and width. The useable capacity of the van or trailer is dependent in part on the width of the opposed sidewall assemblies. The width of long used sidewalls on a van and the like is at least 1.5 inches and comprises a plurality of hat-shaped side posts to which outer and inside side sheets which are riveted by a series of vertically aligned rivets. Attempts have been made to reduce the thickness of the standard sidewalls so that useable space of a van or trailer can be increased. An example of one prior art design for reducing sidewall thickness comprises a thick aluminum plate to which a shallow shaped beam is riveted at the vertical interface between adjacent plates. Such a known plate construction is capable of reducing the thickness of each opposed sidewall structure to approximately ⅝ inch. Other prior designs have also attempted to reduce the thickness of the sidewall by employing a pair of thin metal plates sandwiched over a polyethylene material to form a composite structure having no side posts or beams. The foregoing techniques present several disadvantages including higher weight repair costs, reduced number of logistic posts required for securing loads, or produce a highly flexible structure which may be unsuitable under all loading conditions. All of the known sidewall assemblies further require the extensive use of mechanical fasteners, such as rivets, that results in uneconomical labor costs and time in assembly as well as contributing to additional weight of the sidewalls. Accordingly, it is desirable in the prior art to provide sidewall assemblies for vans and trailers having an optimally thin cross section and which reduce cost of fabrication and assembly and maintains the weight compared to today's standards.

SUMMARY OF THE INVENTION

It is therefore an objective of the invention to provide several embodiments of sidewall assemblies for use in trailers and vans which optimally reduce the thickness and weight of the side structures. The sidewall assemblies of the invention possess suitable higher strength and stiffness characteristics to resist bending and failure while possessing an optimally thin cross section for increasing the useable cargo or article carrying space within a van or trailer. The side assemblies herein disclosed have uniquely shaped side posts interconnecting with an outer side sheet and a plurality of plastic interior panels or liners or lower scuff sheet. The construction of the side assemblies permit the exchange of posts and sheets without significant disassembly of posts and liners in the event of any needed repair. The design of the sidewall herein disclosed reduces cross section thickness up to less than 0.50 inches and provides a smooth interior sidewall having a lighter color to lighten up the darkness of the interior of the van. The plastic liners may interlock with the side posts of the invention through use of a snap on construction, through a sliding insertion, or through mechanical fasteners. In some uses of the invention, the interior of the sidewall assemblies can be sealed in a manner to prevent a build-up of dirt and to maintain sanitary interior conditions. The spacing between the outer side sheet and the plastic panel may include foam or protuberances to increase the rigidity of the sidewall structure of the invention. In all embodiments herein disclosed, the number of required mechanical fasteners is reduced as compared to prior art structures to increase the ease of assembly.

BRIEF DESCRIPTION OF THE DRAWINGS

FIG. 1 is a partial side elevational view of a first embodiment of the sidewall assembly of the invention;

FIG. 2 is a partial top plan view, with parts in section, of the sidewall assembly of the invention taken along lines 2—2 of FIG. 1;

FIG. 3 is a partial top plan of the sidewall assembly of the invention taken along lines 3—3 of FIG. 1;

FIG. 4 is a partial top plan view, with parts in section, of a second embodiment of the sidewall assembly of the invention;

FIG. 5 is a partial top plan view, with parts in section, of a third embodiment of the sidewall assembly for vans of the invention;

FIG. 6 is a partial top plan view, with parts in section, of a first embodiment of the scuff strip of the invention for use with the side assembly of FIG. 2 of the invention;

FIG. 7 is a partial top plan view, with parts in section, of a fourth embodiment of the side wall assembly of the invention;

FIG. 8 is a partial top plan view, with parts in section, of a second embodiment of the scuff strip of the invention attached to the bottom chord;

FIG. 9 is a partial top plan view, with parts in section, of a liner and side post attached to the upper chord;

FIG. 10 is a partial side elevational view of the interior of the sidewall assembly of FIG. 1 having scuff plates;

FIG. 11 is a partial end elevational view of the sidewall assembly of FIG. 10;

FIG. 12 is a partial side elevational view of the sidewall assembly of FIG. 1 having slotted posts;

DESCRIPTION OF THE PREFERRED EMBODIMENTS

Figure 13:
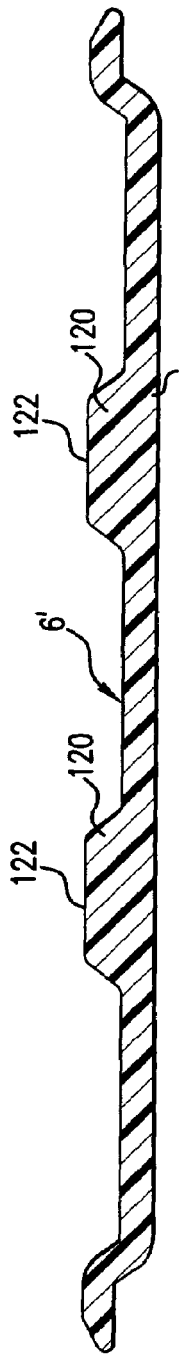
FIG. 13 is a top plan view, with parts in section, of another embodiment of the liner of the invention for use with the embodiment of the side wall assemblies of FIG. 2.

Referring now to FIGS. 1 to 3 there is illustrated a first embodiment of the side assembly of the invention generally designated by reference numeral 2. The side assembly 2 of the invention is intended to be used as a sidewall structure of a cargo or article carrying van or trailer (not shown). As seen in FIGS. 1 to 3, the sidewall assembly 2 comprises a plurality of special vertical wide based shallow side posts 4 which interconnect with an interior plastic panel or liner 6 and an outer sidewall sheet 8. The sidewall assembly 2 is designed to extend generally along the opposed sides of the van or trailer having a plurality of side posts 4 and interior panels 6 disposed vertically in spaced relationship along the length of the vehicle. Each adjacent pair of the side posts may be spaced from each other by 12", 18" or 24" centers or other selected dimensions. Outer sidewall sheet 8 may comprise a single aluminum or steel sheet or a plurality of abutting sheets which are affixed by vertical arrays of mechanical fasteners 10, preferably rivets 10, as seen in FIG. 3. The sidewall assembly 2 is connected to a lower support chord 12 and at its upper end with a top rail extrusion 14 as seen in FIG. 10.

Each of the vertical posts 4 extend the height of the sidewall assembly 2 and is formed as an integral steel, plastic, or aluminum extrusion which may be shaped by stamping or other forming methods. The vertical posts 4 include a shallow modified central hat-shaped section 16 defined by flat central wall 16' and a pair of opposed integral lateral segments 18. The longitudinal flat walls 16' of side posts 4 are disposed in spaced parallel relationship to the interior surface 8' of the outer sheet 8. The lateral segments 22 also form smaller hat-shaped sections 19 in conjunction with base horizontal wall 20 and lateral segments on opposed sides of the central hat-shaped section 16 formed by wall 16' and segments 18. The base wall 20 is positioned in flush relationship to the inner surface 8' of side sheet 8. The vertical arrays of rivets 10 are directed through side sheet 8 and each of the walls 20 of the side post 4 for unitary securement. The opposed edges of the beams 4 include a pair of angular sections or flanges 24 pointing inwards and 26 whereby the edge section or flange 26 projects toward outer side sheet 8 and terminates in spaced relationship to surface 8' to create a continuous vertical slot 28 for receiving an edge portion of liner 6 to be described. Although it is within the scope of the invention to employ other dimensions of posts in conjunction with the invention as required, one suitable post 4 has an overall horizontal width of seven (7) inches with interior wall 16 extending two and three quarter (2¾) inches and walls 20 extending one and one eighth (1⅛) inch each. In such a construction, the overall width of the sidewall assembly to inner face of wall 4 can be approximately 0.5 inches or less, although widths of the sidewall assembly 2 greater than 0.5 inches may be utilized.

The plastic panel or liner 6 in the form of a plastic extrusion and the like has a flat central portion 30 creating a face 32 confronting side sheet 8 and face 34 forming the interior lining wall. The light color of the liner 6 produces a lighter environment within the van or trailer. The interior face 34 is disposed generally along the same vertical plane as the interior face of wall 16' of post 4 for creating a smooth interior surface. The panel or liner 6 further is provided with vertical side portions in the form of edges offset from central portion 30 which are inserted into the slots 28 in frictional contact with side posts 4 and side sheet surface 8'. The width of the projecting edge portions are approximately equal or larger than the spacing between the side post edges or flanges 26 and the side sheet surface 8' forming the slot 28. The side panel 6 may be comprised of a suitably flexible material which can be snapped or bent into place into the slot 28 into contact with both the inner surface 8' of sheet 8 and edge 6 of the side post 4. The plastic panel 6 comprises a single sheet extending the height of the sidewall 2 from the lower support chord 12 to the upper chord 14. Since the liner 6 is secured in the slot 28 of the adjacent posts 4, no mechanical fasteners or chemical substances are needed to secure the liner 6. It is within the scope of the invention, however, to secure the liner 6, including other modifications hereinafter described, to the post 4 by mechanical fasteners if desired.

The foregoing combination of side posts 4, liner 6, and side sheet 8 provides a sidewall assembly 2 of high strength in use, but with a minimal weight and width for significant advantages in a wall of a van or trailer, for an increase of cargo space and reduction of manufacture costs. As will be disclosed later, side assembly 2 can be further strengthened, if desired, through techniques to be described. In the embodiment of FIGS. 1 to 3, the sidewall is adequately strong in the absence of the foam material between the outer sheet 8 and the outer surface of the plastic panel 6 that will be described. Caulking may be used at the bottom portion 14a of upper rail 14 and the top portion 12a of lower chord 12 to seal the liners 6 therewith to prevent the accumulation of substances within the sidewall assembly itself for maintaining sanitary conditions in uses in which such an environment is useful.

Referring now to FIG. 4, there is illustrated a second embodiment of the sidewall assembly of the invention, generally designated by reference numeral 2a. The sidewall assembly 2a has a plurality of side posts 4a, interior plastic liner 6a, and an outer side sheet 8a. The side posts 4a, the plastic liner 6a, and side sheet 8a are arranged along the length of the van or trailer in a similar manner as described with reference to the first embodiment of FIGS. 1 to 3. The posts 4a include a similar cross section as illustrated as side posts 4 in FIGS. 2 and 3, except that the edge portion 24a comprises a longitudinally extending edge portion. The central portion 16' of the side posts 4a lies in spaced relation to side sheet 8 and extends generally between the opposed edges of adjacent plastic liners 6a to interconnect with a modified construction of the plastic liner 6a as will be described. As in the previous embodiment, the wall 20a of the opposed small hat-shaped sections of post 4 are riveted in contacting relationship with side sheet 8 by rivets 10a.

As seen in FIG. 4, the central portions 30a of the plastic liner 6 extends generally the width between the opposed edges of adjacent side posts 4a. The section 30a is provided with an angularly arranged projection 40a extending toward the outer sheet 8a and having an enlarged end 40a'. The projection 40a forms a groove 42a for receiving the edge of the adjacent side post 4a snap-in. As further seen in FIG. 4, the edge portion 34a extends beyond the smaller hat-shaped section 19 of the side posts 4a and terminates with a right angled protuberance 34b having a rounded end 34c to contact the wall 20a of the smaller hat-shaped section 19 of the side post 4a. The edge portion 34a in part serves to protect the posts and rivets from damage from external forces. The outer wall of the protuberance 34b is in contact or near contact with the wall 18a. In the second embodiment of FIG. 4, the interior liner panel 30a is snapped into position by being biased over the edge of the portion 24a of the side post 4a to be received in the groove 42a and retained in position by the angular orientation of the projection 40a and its enlarged end 40a'. The rigidity of the side assembly 2a is further increased by the presence of a plurality of dome like projections 44a are formed on the liner 6a and have a contacting end 46a to contact the interior wall 8a' of the side panels preventing outward deflection after impact. Although any number of projections 44a may be used in the embodiment of FIG. 4, a pair of such structures are shown. The projections may also be formed in other shapes than as shown.

Referring now to FIG. 5 there is illustrated a third embodiment of the invention of the application, generally designated as sidewall assembly 2b. The sidewall assembly 2b has a plurality of side posts 4b, a plastic liners 6b, and a side sheet 8b. The sidewall construction 2b is of a similar construction as the embodiment of FIG. 4, except that projections 44a have been eliminated in the spacing between the side sheet 8b and the wall 30b of the liner 6b. A foam block material 50 is sandwiched between the plastic liner 6b and the interior wall 8b' of the aluminum side sheets 8b. The foam increases puncture resistant and increase rigidity of the sidewall assembly with a minimum contribution of weight and can be glued to each of the walls to insure stability, stiffness, and proper positioning. The foam block 50 can also be utilized to render the sidewall assembly 2 of the first embodiment of FIGS. 1 to 3 more rigid.

Referring now to FIGS. 6, 11, and 12, there is illustrated a first embodiment of an interlocking scuff strip of the invention, generally designated by reference numeral 60. As seen best in FIGS. 11 and 12, the scuff strip 60 comprises a strip of metal, such as, for example, aluminum, which is disposed in interlocking relationship beneath the liner panel 6 of the sidewall interior. The scuff strip 60 is intended to protect the sidewall assembly from movement of lading and articles in contact with the wall at lower portions and has a height proportionally less than the height of the sidewall assembly 2. As seen in FIG. 12, the outer surface 62 of the scuff strip lies in same approximate plane as the outer surface 34 of the liner 6 forming the interior wall of the van or trailer. As best illustrated in FIGS. 11 and 12, the upper edge 66 of the scuff strip lies in contacting relationship to the bottom edge 30' of the liner 6 to form a continuous sidewall interior surface. The scuff strip 60 interlocks with the adjacent side post 4 through an edge portion 66 having an enlarged head in surface 68 to contact the edge of bent section 26 of the side post within the slot 28 created with the side sheet 8. The plurality of T-shaped projections 70 extend into contact with the interior wall 8' of the side sheet 8 to maintain the spacing of the scuff sheet 60 from the sidewall, create rigidity and to maintain the interlocking relationship of the edge portion 26 and enlarged head 68. As is the obvious from the previous discussion, scuff sheets 60 are positioned along the bottom of the sidewall assembly along its length beneath every interior panel 6.

Referring now to FIG. 7, there is illustrated a fourth embodiment of the side wall assembly of the invention, generally designated by reference numeral 60a. The liner 60a is similar to side sheet 30b previously described and is disposed. The liner 60a includes a flat wall 70 having a plurality of spaced projections 72 in contact with the side sheet 8 to maintain spacing between the liner 60a and the side sheet 8 and to increase rigidity of the wall structure. An angularly oriented projection 74 having an enlarged head portion 76 is formed on the liner 60a and is arranged to resiliently engage the edge portion 24a of side post 4a. Resilience of the metal projection 74 is increased by relief cut-out 78. The edge portion 80' of the liner 60a extends over the smaller hat-shaped section 19a of the side posts 4a and includes a right angle projection 82 in contact with the wall 20a. Thus, the construction of the liner 60a interlocks with the side post 4a and generally conforms to the construction of the cross section of the liner 60a to form a continuous surface down the sidewall assembly.

Referring now to FIGS. 10 and 11, it is illustrated that the sidewall assembly 2 extends between the bottom chord 12 and the upper chord 14. The configuration of the lower chord 12 and upper chord 14 shown in FIG. 11 may be used in conjunction with any of the embodiments of the sidewall assemblies herein disclosed, with or without scuff sheets. The upper portion of the sidewall assembly is riveted along the length of the van or trailer to the lower flange 14a of upper chord 14 and to the upper flange 12a of lower chord 12.

Referring now to FIG. 8, there is illustrated another embodiment of the scuff strip, generally designated a scuff sheet 60b, and shown in attachment to the bottom support chord 14. The scuff strip 60b includes a flat panel 80 having a plurality of T-shaped projections 82 contacting the side sheet 8. An inverted L-shaped section 84 is provided adjacent to the side post 4b and includes a surface 84' in contact with the inner surface 8a of the sidewall 8. The peripheral portions edge 86 of the scuff sheet 82 includes an offset section 86' and a pair of projections 88 forming a nesting relationship of the edge portion 86 within a smaller U-shaped section 19a of the posts 4a. A rivet 90 extends through the edge portion 86, the sidewall 8, and the lower chord 12 to interconnect the bottom edges to the lower chord. The sidewall assembly may also be similarly attached to the upper chord (not shown).

Referring to FIG. 9, there is illustrated an example of a liner panel 6d and side post 4d being affixed to the upper chord 14 on flange 14a by a rivet 101. The liner 6d is similar to liner 6a illustrated in FIG. 4, but includes an additional projection 102 and a peripheral offset nesting edge 104. The rivet 101 extends through the offset edge portion 104 of the liner d., through wall 20d of post 4d and the flange of the upper chord 14 for attachment of liner and post to the upper chord. A washer or plate (not shown) may be positioned on the rivet 101 as a spacer between the flange and edge portion 104.

Referring to FIG. 12, there is illustrated the sidewall of the invention having a plurality of modified side posts 110 interconnected with plastic liners 112 in accordance with the invention. The posts 110 are formed with a plurality of open slots 114 along their height from the top chord 14 to the lower chord 12. The slots are generally equally spaced along the height of the side post 110 and are used as anchor slots to provide points at which securement elements may be inserted to secure the lading within the van or trailer. An enlarged spacing 116 is provided at the bottom of each post 110 to provide access to the interior for cleaning and removal of debris.

Referring to FIG. 13, there is illustrated another embodiment of the panel or liner, generally designated as panel or liner 6', for use with the wall assembly 2 of FIGS. 1–3. The liner 31' is generally similar to liner 6 except liner 6' includes a pair of protuberances 120 integrally formed extending into contact with inner wall 8' of side panel 80 for making the liner 6' more rigid. The protuberances 120 include flat side sheet abutting surfaces 122 for improved contact therewith. Other similar protuberances (not shown) may be placed between protuberances 120 if desired.

Figure 14:
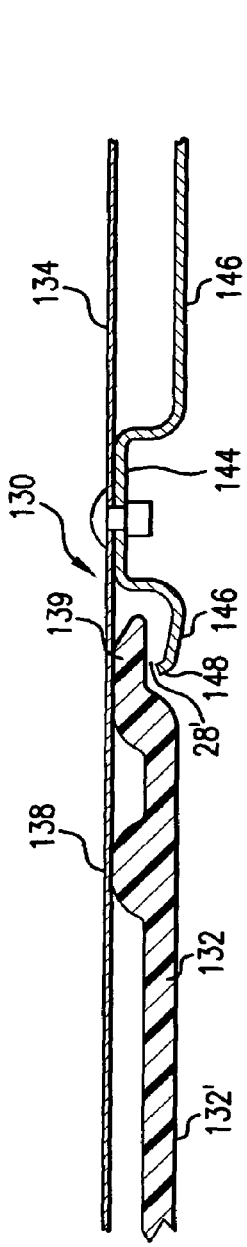
FIG. 14 is a top partial plan view, with parts in section, of a fifth embodiment of the side wall assembly of the invention.
Figure 15:
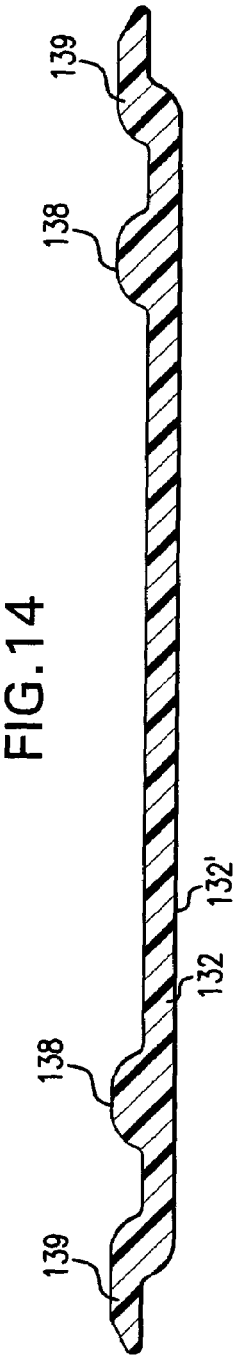
FIG. 15 is a top plan view, with parts in section, of still another embodiment of the liner of the invention for use with the side assembly of the invention shown in FIG. 14.
Figure 16:
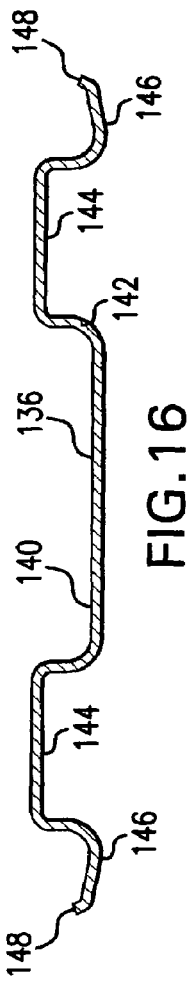
FIG. 16 is a top enlarged plan view, with parts in section, of the side post of FIG. 15.

Referring now to FIGS. 14 to 16, there is illustrated another of the side wall assembly of the invention, generally designated by reference numeral 130. The side wall assembly 130 includes a plastic liner or panel 132 having flat inner face 132', and a side wall sheet 134, and a metal side post 136. The liner 132 is similar to the liner 6 disclosed in reference to FIGS. 1–3, but includes a protuberance 138 immediately adjacent the offset edge portion 139 which is disposed in slot 28' between the side post 136 and the side wall sheet 134. The central portion 140 of side post 136 includes a center hat-shaped section 142 and the edge portion's include bordering reversed hat-shaped sections 144. A flange 146 extends on each side of hat-shaped sections 144 in an direction at an acute angle toward the side sheet 134 and outward relative to the van or trailer (not shown) from the plane of face 132'. The end 148 of the flange 146 is bent further toward the side sheet 134 to reduce exposure of the end 148 of the flange 146 to the cargo area of the van or trailer to reduce snagging of any vehicles of lading with the side post flanges 146.

What is claimed is:

1. A sidewall assembly for a transporting vehicle comprising
    at least one outer flat side sheet having an inner surface extending along a longitudinal axis,
    a plurality of vertical side posts being affixed to said at least one outer side sheet in spaced relationship along said inner surface, said side posts having a flat inner wall lying in spaced relationship to said inner surface of said at least one side sheet,
    said side posts further having a pair of bent edge sections lying on opposite vertical sides of said flat inner wall, said bent edge segments projecting from said flat inner wall toward said at least one said side sheet and, said bent edge sections having an edge terminating in spaced relationship to said inner surface
    a plurality of liners respectively extending between adjacent side posts, said liners having a flat central portion forming a generally flat interior face,
    said liners having vertical side portions extending on opposite vertical sides of said central portion respectively for interconnecting with said bent edge sections of said side posts and said vertical side portions respectively extending beyond said edge to cover at least a portion of said bent edge sections, and
    said flat inner wall of said side post forms an inner face substantially lying in the same vertical plane as said flat interior face of said liner.

2. The sidewall assembly according to claim 1 wherein a surface of said flat central portion of said liners confronts said inner surface of said at least one side sheet and lies in spaced relationship to said at least one side sheet.

3. The sidewall assembly according to claim1 wherein said inner wall of said side posts is formed by an intermediate generally hat-shaped section of said side posts.

4. A sidewall assembly for a transporting vehicle comprising
    at least one outer flat side sheet having an inner surface extending along a longitudinal axis,
    a plurality of vertical side posts being affixed to said at least one outer side sheet in spaced relationship along said inner surface wall, said side posts having a flat inner wall lying in spaced relationship to said inner surface wall of said at least one side sheet,
    said side posts further having a pair of bent edge sections lying on opposite vertical sides of said flat inner wall, said bent edge sections projecting from said flat inner wall toward said at least one said side sheet and, said bent edge sections having an edge terminating in spaced relationship to said inner surface,
    a plurality of liners respectively extending between adjacent side posts, said liners having a flat central portion forming a generally flat interior face,
    said liners having vertical side portions extending on opposite vertical sides of said central portion respectively for interconnecting with said bent edge sections of said side posts and said vertical side portions respectively extending beyond said edge to cover at least a portion of said bent edge sections,
    said inner wall of said side posts is formed by an intermediate generally hat-shaped section of said side posts, and
    said hat-shaped section includes a pair of lateral sections segments integrally joined in perpendicular relationship on opposite vertical sides of said inner surface wall of said at least one on side post.

5. The sidewall assembly according to claim 4 wherein said bent edge sections of said side posts are respectively formed by generally edge hat-shaped sections partially including said bent edge sections.

6. The sidewall assembly according to claim 5 wherein said edge hat-shaped sections include a base wall lying in generally flush relationship with said inner surface of said at least one side sheet.

7. The sidewall assembly according to claim 6 further comprising a plurality of mechanical fasteners extending through said base wall of each of said side posts and said at least one side sheet.

8. The sidewall assembly according to claim 1 wherein the edge of said bent edge sections of said side posts contacts the vertical side portions of said liner.

9. The sidewall assembly according to claim 6 wherein said vertical side portions of said liner lie in spaced relationship respectively to said base wall of said edge hat-shaped sections of said side posts, said vertical side portions of said liners respectively having at least one projection having an end extending in contact with said base wall.

10. The sidewall assembly according to claim 9 further including at least one projection extending between said central portion of said liner and said inner surface of said at least one side sheet.

11. The sidewall assembly according to claim 9 further including foam means being positioned between said central portion of said liner and said inner surface of said at least one side sheet.

12. The side wall assembly according to claim 1 wherein said opposed vertical side portions extend to said central portion.

13. A side wall assembly for a vehicle having an outer side wall comprising
    side post means extending vertically along an inner surface of the outer side wall sheet in connected relationship,
    said side post means includes opposite edge sections extending in spaced relation to said inner surface,
    a plurality of liners having a central wall forming an interior face and having side portions engaging said side post means for securement, and
    at least a part of side portions extending over said edge sections being offset from said central wall, and
    said side post means forms an interior surface, said interior surface being coplanar with said interior face.

14. The side wall assembly according to claim 13 further including a projection arranged to extend from said central wall in contact with the side wall sheet.

15. The side wall assembly according to claim 13 wherein a foam material is positioned between said central wall and said inner surface.

16. The side wall assembly according to claim 13 wherein said side portions form coplanar extensions of said interior face.

17. A sidewall assembly for a transporting vehicle comprising
- at least one outer flat side sheet having an inner surface extending along a longitudinal axis,
- a plurality of vertical side posts being affixed to said at least one outer side sheet in spaced relationship along said inner surface wall, said side posts having a flat inner wall lying in spaced relationship to said inner surface wall of said at least one side sheet,
- said side posts further having a pair of bent edge sections lying on opposite vertical sides of said flat inner wall, said bent edge sections projecting from said flat inner wall toward said at least one said side sheet and, said bent edge sections having an edge terminating in spaced relationship to said inner surface,
- a plurality of liners respectively extending between adjacent side posts, said liners having a flat central portion forming a generally flat interior face,
- said liners having vertical side portions extending on opposite vertical sides of said central portion respectively for interconnecting with said bent edge sections of said side posts and said vertical side portions respectively extending beyond said edge to cover at least a portion of said bent edge sections, and each of said vertical side portions have a projection engaging said edge.

18. The side wall assembly according to claim 17 wherein said projection forms a groove for receiving said edge.

19. The side wall assembly according to claim 17 wherein said liners each include a cut-out area adjacent to said projection.

20. The side wall assembly according to claim 17 wherein said vertical side portions each include an edge portion having a projection engaging said bent edge sections.

21. A side wall assembly for a vehicle having an outer side wall comprising
- side post means extending vertically along an inner surface of the outer side wall sheet in connected relationship,
- said side post means includes opposite edge sections extending in spaced relation to said inner surface,
- a plurality of liners having a central wall forming an interior face and having side portions engaging said side post means for securement, at least a part of side portions extending over said opposite edge sections, and
- said opposite edge sections include an end spaced from said inner surface, said side portions include respective projections engaging said end of said opposite edge sections.

22. The side wall assembly to claim 21 wherein said at least part of said side portions include an end protuberance projection contacting said opposite edge sections.

* * * * *